United States Patent
Mollet et al.

(10) Patent No.: US 8,504,218 B2
(45) Date of Patent: Aug. 6, 2013

(54) METHODS AND SYSTEMS FOR UNIVERSAL INPUT OUTPUT FOR VEHICLE CONTROL

(75) Inventors: Samuel Robert Mollet, Grain Valley, MO (US); Michael Scott Mitchell, Lee's Summit, MO (US)

(73) Assignee: General Electric Company, Schenectady, NY (US)

( * ) Notice: Subject to any disclaimer, the term of this patent is extended or adjusted under 35 U.S.C. 154(b) by 957 days.

(21) Appl. No.: 11/831,387

(22) Filed: Jul. 31, 2007

(65) Prior Publication Data
US 2009/0037038 A1 Feb. 5, 2009

(51) Int. Cl.
G05D 1/00 (2006.01)
G05D 3/00 (2006.01)
G06F 7/00 (2006.01)
G06F 17/00 (2006.01)

(52) U.S. Cl.
USPC ............ 701/1; 701/19; 701/36; 710/1; 710/8; 710/63

(58) Field of Classification Search
USPC ... 701/19, 63, 1, 36; 710/1, 8, 62, 63; 703/23, 703/24, 25; 700/1, 28; 246/1 C, 3, 131, 132, 246/167 R, 176, 182 R, 186, 192 R, 218, 246/219, 220, 221
See application file for complete search history.

(56) References Cited

U.S. PATENT DOCUMENTS

| | | | | |
|---|---|---|---|---|
| 5,014,238 | A * | 5/1991 | McLeish et al. | 702/189 |
| 6,459,175 | B1 | 10/2002 | Potega | |
| 6,552,933 | B2 | 4/2003 | Roohparvar | |
| 6,612,245 | B2 | 9/2003 | Kumar | |
| 6,973,378 | B2 * | 12/2005 | Yamada | 701/48 |
| 7,369,079 | B2 * | 5/2008 | Maier | 341/155 |
| 7,377,180 | B2 | 5/2008 | Cunningham | |
| 7,436,687 | B2 | 10/2008 | Patel | |
| 2007/0073908 | A1 * | 3/2007 | Gormley | 710/8 |
| 2007/0073944 | A1 * | 3/2007 | Gormley | 710/72 |

OTHER PUBLICATIONS

PCT International Search Report issued in WO/PCT/US2008/066916 on Apr. 4, 2011.

* cited by examiner

*Primary Examiner* — Thomas H. Tarcza
*Assistant Examiner* — Rami Khatib
(74) *Attorney, Agent, or Firm* — GE Global Patent Operation; John A. Kramer

(57) ABSTRACT

Methods and systems for controlling a vehicle are provided. The system includes a controller configured to generate output signals using input signals received from a plurality of different types of input devices wherein the controller is configured to operate at a predetermined logic level and a universal input module corresponding to each type of the plurality of different types of input devices. The universal input module is configured to receive an input signal from an associated input device of one of the different types, determine an operating range of the input device corresponding to one of the different types of input devices, and transmit an output to the controller at the predetermined logic level wherein the output corresponds to the received input scaled to the determined operating range.

18 Claims, 3 Drawing Sheets

METHODS AND SYSTEMS FOR UNIVERSAL INPUT OUTPUT FOR VEHICLE CONTROL

BACKGROUND

This invention relates generally to a vehicle control system, and more particularly to methods and systems for universal input and output of vehicle control systems.

At least some known vehicles are powered by a power supply having specific electrical characteristics. The control and input/output devices associated with the vehicle are generally selected to match the electrical characteristics of the power supply. Such characteristics include, for example (but not limited to), voltage, current, and frequency. However, there are many generations of the same type of vehicle and/or there may be a plurality of vendors of the vehicles, with each vendor having particular design proclivities. Vehicles generally have control and sensing component that are powered from the vehicle battery and/or generator. Because of various design choices, vehicles frequently include batteries and electrical systems having different nominal voltages, and control and sensing components are often different and incompatible from vehicle to vehicle. Further, vehicles may traverse territories that include differing wayside or off-board communication protocols. Such diversity makes spare part and replacement part inventories excessively large and may limit a vehicle's mobility into different territories without time consuming and expensive modification.

Currently, vehicles are customized to specifications based on the purchasers' territory, already installed equipment, and modernization attempts. Such an approach limits for example, locomotive, or train type interoperability.

SUMMARY

In one embodiment, a system for controlling a vehicle includes a controller configured to generate output signals using input signals received from a plurality of different types of input devices wherein the controller is configured to operate at a predetermined logic level and a universal input module corresponding to each type of the plurality of different types of input devices. The universal input module is configured to receive an input signal from an associated input device of one of the different types, determine an operating range of the input device corresponding to one of the different types of input devices, and transmit an output to the controller at the predetermined logic level wherein the output corresponds to the received input scaled to the determined operating range.

In another embodiment, a method of controlling a vehicle includes receiving an input signal from an input device, determining an operating range of the input signal and a type of the input device, and generating an output signal corresponding to the received input signal that is scaled to a predetermined controller logic level.

In yet another embodiment, a train locomotive includes an engine, a controller configured to control the operation of the locomotive, said controller generate output signals using input signals received from a plurality of different types of input devices, said controller configured to operate at a predetermined logic level, and a universal input module corresponding to each type of the plurality of different types of input devices. The universal input module is configured to receive an input signal from an associated input device of one of the different types, determine an operating range of the input device corresponding to one of the different types of input devices, and transmit an output to the controller at the predetermined logic level wherein the output corresponds to the received input scaled to the determined operating range.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, systems and methods for monitoring and controlling a vehicle. However, it is contemplated that this disclosure has general application to controlling input and outputs for various controllers and control systems in industrial, commercial, and residential applications.

Figure 1:
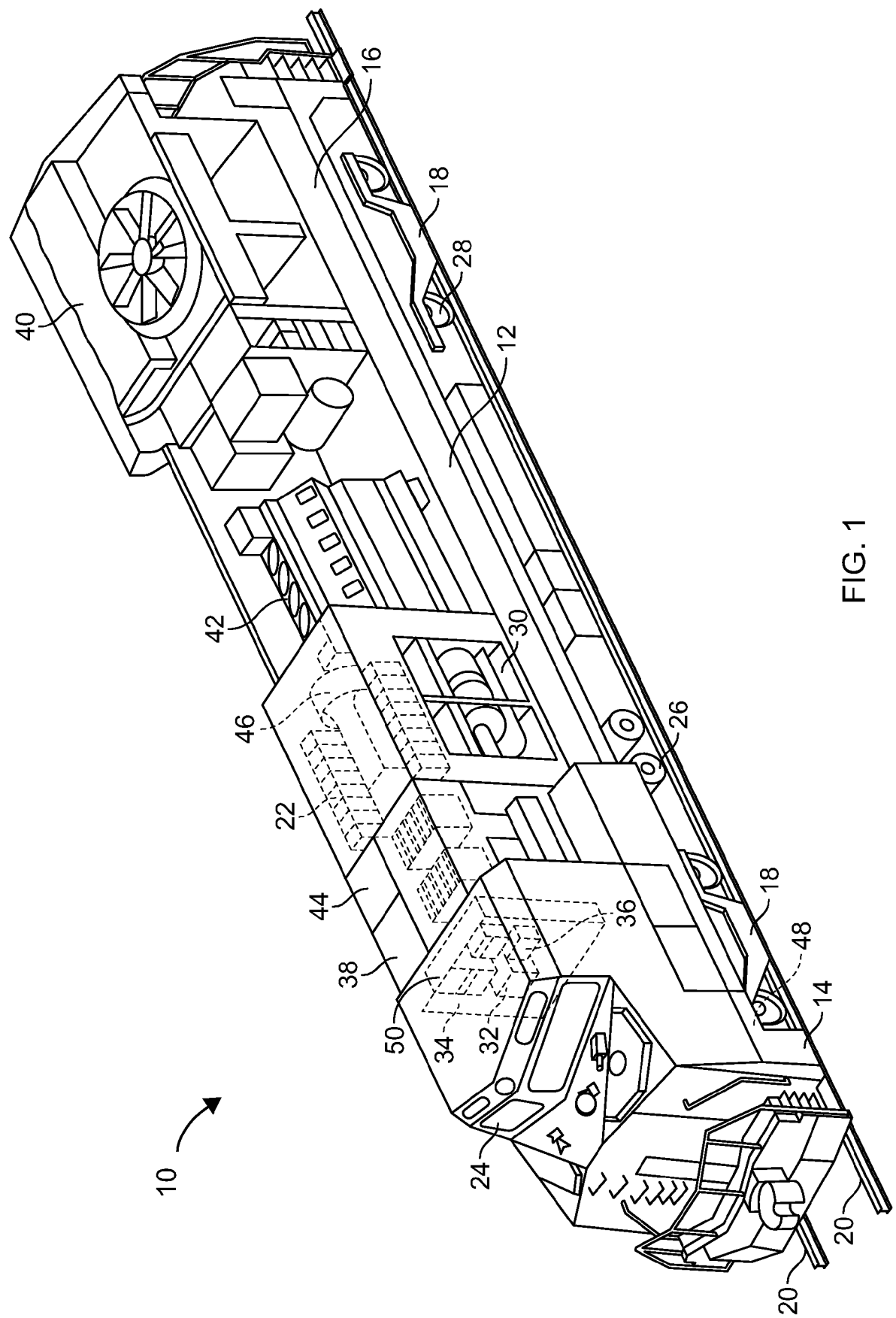
FIG. 1 is a partial cut away view of an exemplary Off-Highway Vehicle (OHV) in accordance with an embodiment of the present invention.

FIG. 1 is a partial cut away view of an exemplary Off-Highway Vehicle (OHV). In the exemplary embodiment, the OHV is a locomotive 10. Locomotive 10 includes a platform 12 having a first end 14 and a second end 16. A propulsion system 18, or truck is coupled to platform 12 for supporting, and propelling platform 12 on a pair of rails 20. An equipment compartment 22 and an operator cab 24 are coupled to platform 12. An air and air brake system 26 provides compressed air to locomotive 10, which uses the compressed air to actuate a plurality of air brakes 28 on locomotive 10 and railcars (not shown) behind it. An auxiliary alternator system 30 supplies power to all auxiliary equipment and is also utilized to recharge one or more on-board power sources. An intra-consist communications system 32 collects, distributes, and displays consist data across all locomotives in a consist.

A cab signal system 34 links the wayside (not shown) to a train control system 36. In particular, system 34 receives coded signals from a pair of rails 20 through track receivers (not shown) located on the front and rear of the locomotive. The information received is used to inform the locomotive operator of the speed limit and operating mode. A distributed power control system 38 enables remote control capability of multiple locomotive consists coupled in the train. System 38 also provides for control of tractive power in motoring and braking, as well as air brake control.

An engine cooling system 40 enables engine 42 and other components to reject heat to cooling water. In addition, system 40 facilitates minimizing engine thermal cycling by maintaining an optimal engine temperature throughout the load range, and facilitates preventing overheating in tunnels. An equipment ventilation system 44 provides cooling to locomotive 10 equipment.

A traction alternator system 46 converts mechanical power to electrical power which is then provided to propulsion system 18. Propulsion system 18 enables locomotive 10 to move and includes at least one traction motor 48 and dynamic braking capability. In particular, propulsion system 18 receives power from traction alternator 46, and through traction motors 48 moves locomotive 10. Locomotive 10 systems are monitored and/or controlled by a train control system 50.

Train control system 50 generally includes at least one computer that is programmed to perform the functions described herein. Computer, as used herein, is not limited to just those integrated circuits referred to in the art as a computer, but broadly refers to a processor, a microprocessor, a microcontroller, a programmable logic controller, an application specific integrated circuit, and another programmable circuit, and these terms are used interchangeably herein.

Figure 2:
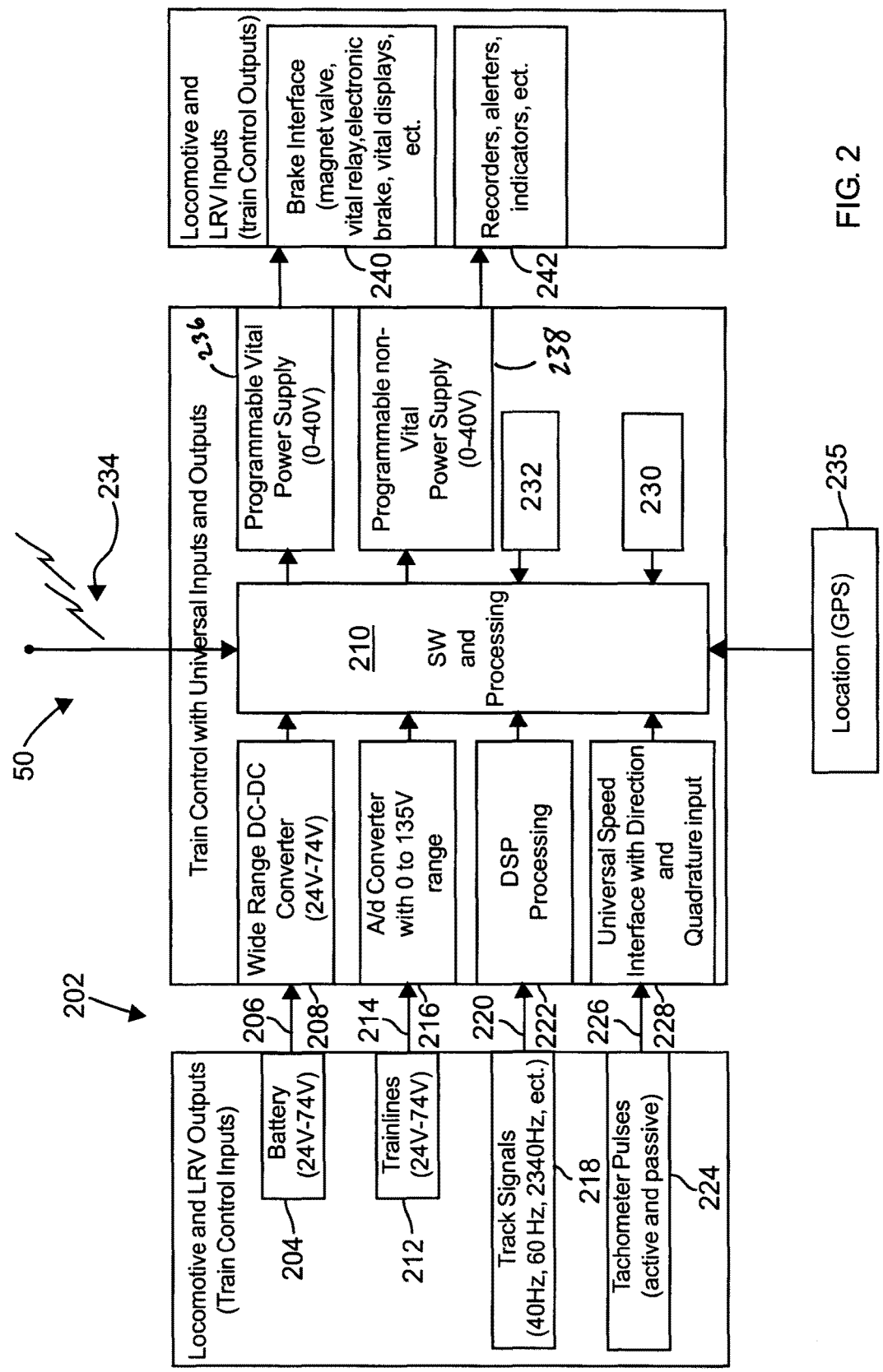
FIG. 2 is a schematic block diagram of the train control system shown in FIG. 1 in accordance with an exemplary embodiment of the present invention.

FIG. 2 is a schematic block diagram of train control system 50 (shown in FIG. 1) in accordance with an exemplary embodiment of the present invention. In the exemplary embodiment, train control system 50 receives inputs signals 202 from locomotive or light rail vehicle (LRV) system outputs. For example, a locomotive battery 204 may have a nominal voltage for example, 24 VDC, 32 VDC, 48 VDC, 64 VDC, and 74 VDC, depending on, for example, the make, manufacturer, territory of operation, or vintage of the locomotive or LRV. A battery nominal voltage signal 206 is transmitted to a universal input module 208 of train control system 50. In the exemplary embodiment, universal input module 208 comprises a wide-range DC-DC converter configured to sense the nominal voltage of battery 204. A processor 210 is configured to receive the sense nominal voltage and configure train control system 50 to operate at the sensed nominal voltage. In an alternative embodiment, train control system 50 receives a configuration that describes the nominal voltage, for example, in a data file. Using the information in the data file, train control system 50 adjusts the input scale of universal input module 208 and scales any threshold settings associated with universal input module 208. Similarly, trainlines 212 signals 214 are sensed and transmitted to a universal input module 216 comprising an analog-to-digital converter (ADC). Universal input module 216 is also configured to scale sensed trainline signals 214 and any associated threshold settings.

Track signals carry signal information through the track rails at different modulating frequencies depending largely on the territory the locomotive or LRV is operating. A track signal receiver 218 transmits signals 220 to universal input module 222 that comprises for example, a digital signal processor (DSP) configured to sense the modulating frequency of the track signals and to configure universal input module 222 to demodulate the track signals using the proper frequency. A tachometer 224 transmits pulses based on wheel rotation to provide a speed input to train control system 50. Tachometer pulses 226 are transmitted to a universal input module 228 that comprises a universal speed interface with direction and quadrature input.

In the exemplary embodiment, the input signals are sensed and an operating range of the sensed signals is determined. The output of the universal input modules is then scaled to be used in processor 210. Such a determination permits train control system 50 to be removed from a locomotive and reinstalled in a different locomotive having input devices with different operational ranges of their respective output signals. For example, train control system 50 may be removed from a first locomotive having a 48 Volt battery system and reinstalled into a second locomotive having a 74 Volt battery system. Train control system 50 is able to sense the different nominal voltages of the battery systems and adjust its configuration to permit operation in the second locomotive. Similarly, control system 50 automatically senses operating ranges of signals from other input devices to select a configuration that permits control system 50 to operate with the signals from the input devices associated with the different locomotive. Additionally, control system 50 may receive configuration information from onboard the vehicle such as through download from a removable storage medium for example, a floppy disk, jump drive, direct or wireless connection to a portable computer or personal digital assistant (PDA) 230. Control system 50 may also receive configuration information from a keypad 232 communicatively coupled to processor 210 through a wired or wireless connection. Further, control system 50 may receive configuration information from off-board vehicle 10 such as through a wireless connection 234 to, for example, a central control facility (not shown), a wayside device, or another locomotive. In the exemplary embodiment, train control system 50 is also configured to receive vehicle location information from for example, a global positioning satellite (GPS) system 235. Using the received GPS information, train control system 50 selects a configuration that corresponds to the current location of the vehicle indicated by the received GPS information.

Train control system 50 is communicatively coupled to a programmable vital power supply 236 and/or a programmable non-vital power supply 238. Train control system 50 generates a control signal that is transmitted to programmable vital power supply 236 and programmable non-vital power supply 238. The control signal is based on the information contained in the received configuration and controls the output level and characteristics of programmable vital power supply 236 and/or a programmable non-vital power supply 238. For each particular locomotive that train control system 50 may be installed, devices may operate on different power supply levels and/or frequencies. Train control system 50 is configured to control programmable vital power supply 236 and programmable non-vital power supply 238 to supply the correct power to the devices operating on the locomotive on which train control system 50 is installed. For example, programmable vital power supply 236 may be coupled to a brake interface 240, which may include magnet valves, vital relays, electronic brakes, vital displays, and other components that are configured to operate properly with a specific power supply level. Programmable non-vital power supply 238 may be coupled to components 242 such as recorders, alerters, and indicators that are also that are configured to operate properly with a specific power supply level. Train control system 50 controls programmable vital power supply 236 and programmable non-vital power supply 238 to supply the correct power to programmable vital power supply 236 and programmable non-vital power supply 238.

Figure 3:
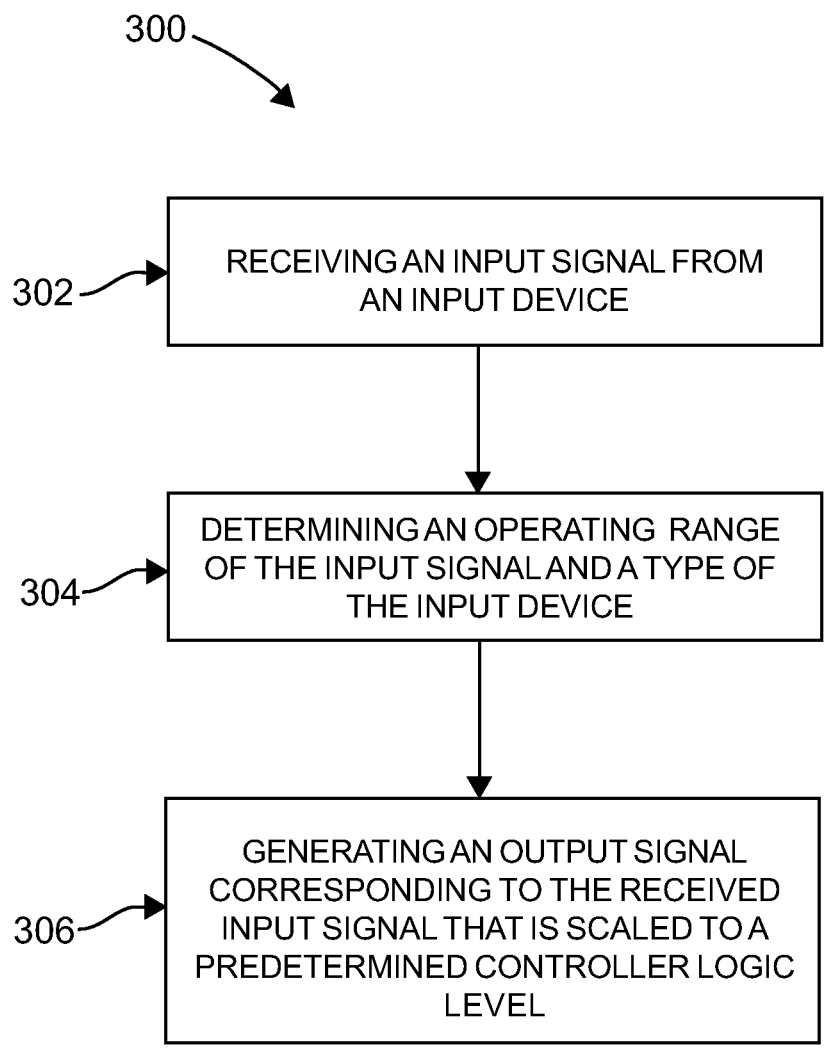
FIG. 3 is a flow chart of an exemplary method of controlling a vehicle in accordance with an embodiment of the present invention.

FIG. 3 is a flow chart of an exemplary method 300 of controlling a vehicle in accordance with an embodiment of the present invention. In the exemplary embodiment, method 300 includes receiving 302 an input signal from an input device, determining 304 an operating range of the input signal and a type of the input device, and generating 306 an output signal corresponding to the received input signal that is scaled to a predetermined controller logic level. The operating range may be determined using an automatic algorithm or may be determined based on a configuration of the particular vehicle. Additionally, the configuration may be determined manually and entered into the algorithm through a user input device such as a PDA or keypad.

As will be appreciated by one skilled in the art and based on the foregoing specification, the above-described embodiments of the disclosure may be implemented using computer programming or engineering techniques including computer software, firmware, hardware or any combination or subset thereof, wherein the technical effect is controlling a vehicle using a control system permitting universal inputs and outputs for a plurality of vehicles having different configurations. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described methods and systems of controlling a vehicle are cost-effective and highly reliable. The methods and systems facilitate operating a vehicle that operates across different territories and permits interoperability of equipment in different installations in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A control system for vehicles, said system comprising:
a controller configured to generate output signals using first input signals received from a plurality of different first input devices disposed onboard a first vehicle, the first input devices configured to sense operating parameters of the first vehicle and to generate the first input signals; and
a universal input module corresponding to the plurality of different first input devices and associated with threshold settings used for the first input signals received from the first input devices, said universal input module is configured to:
receive the first input signal from at least one of the plurality of different first input devices; and
based on the first input signal, determine a first operating range of the at least one of the plurality of different first input devices,
wherein the controller is configured to scale the threshold settings of the universal input module that are associated with the first input devices based on the first operating range that is determined by the universal input module, and
wherein the controller and the universal input module are configured to be removed from the first vehicle and installed on a second vehicle having a plurality of second input devices, the universal input module also configured to receive a second input signal from at least one of the second input devices and determine a second operating range of the at least one of the second input devices that differs from the first operating range based on the second input signal, the controller also configured to change the threshold settings of the universal input module to be used with the second input devices by scaling the threshold settings based on the second operating range.

2. A system in accordance with claim 1 further comprising a universal output module configured to:
determine an operating range of a controlled device;
receive a controller output corresponding to the controlled device; and
generate a module output using the controller output scaled to the determined operating range.

3. A system in accordance with claim 2 wherein said universal output module comprises a programmable power supply.

4. A system in accordance with claim 1 wherein one or more of said first input devices or said second input devices comprise at least one of a battery, a trainline, a track signal, or a tachometer.

5. A system in accordance with claim 1 further comprising a global positioning satellite (GPS) system input to said controller, said controller configured to determine a territory of operation of at least one of the first vehicle or the second vehicle using the GPS input, said controller further configured to select an operating range for at least one universal output module using the determined territory.

6. A system in accordance with claim 1 further comprising a data entry device configured to receive a manual input selecting a configuration stored in a memory of the controller wherein the configuration includes associated operating ranges for at least one universal output module.

7. A system in accordance with claim 1 further comprising a data communication device configured to receive a configuration from off board the first vehicle and the second vehicle, wherein the configuration includes associated operating ranges for at least one universal output module.

8. A system in accordance with claim 1, wherein said first input devices comprise at least one of a nominal voltage input device, an analog voltage signal input device, a frequency modulated input device, or a pulse input device.

9. A system in accordance with claim 1, wherein at least one of the first input signals or the second input signals include track signals received via a track.

10. A method of controlling vehicles, said method comprising:
receiving a first input signal from a first input device configured to sense an operating parameter of a first vehicle and to generate the first input signal;
determining a first operating range of the first input device using a universal input module and based on the first input signal that is received, the universal input module associated with one or more threshold settings used for the first input signal received from the first input device;
using a controller disposed onboard the first vehicle, scaling the one or more threshold settings of the universal input module that are associated with the first input devices based on the first operating range that is determined;
removing the controller and the universal input module from the first vehicle and installing the controller and the universal input module on a second vehicle having a second input device;
receiving a second input signal from the second input device of the second vehicle;
determining a second operating range of the second input device using the universal input module; and
scaling the one or more threshold settings of the universal input module to be used with the second input device based on the second operating range that is determined.

11. A method in accordance with claim 10 wherein determining at least one of the first or second operating range of the respective first or second input device comprises receiving a configuration of the respective first or second vehicle that includes the respective first or second operating range of the respective first or second input device.

12. A method in accordance with claim 10 further comprising:
- receiving current location information for at least one of the first or second vehicle;
- determining a territory associated with the current location; and
- selecting a configuration for at least one of the controller or the universal input module using the determined territory.

13. A method in accordance with claim 10 wherein the controller further includes a universal output module, said method further comprising:
- determining an operating range of a controlled device by the universal output module;
- receiving a controller output corresponding to the controlled device; and
- generating a universal output module output using the controller output scaled to the first or second operating range that is determined.

14. A first locomotive comprising:
- an engine;
- a controller configured to control one or more operations of the first locomotive, said controller further configured to generate output signals using first input signals received from a plurality of different first input devices; and
- a universal input module corresponding to each of the plurality of different first input devices and associated with threshold settings used for the first input signals received from the first input devices, said universal input module is configured to:
  - receive the first input signal from at least one of the plurality of different first input devices;
  - based on the first input signal, determine a first operating range of the at least one of the plurality of different first input devices,
- wherein the controller is configured to scale the threshold settings of the universal input module that are associated with the first input devices based on the first operating range that is determined by the universal input module, and wherein the controller and the universal input module are configured to be removed from the first locomotive and installed on a second locomotive having a plurality of second input devices, the universal input module also configured to receive a second input signal from at least one of the second input devices and determine a second operating range of the at least one of the second input devices that differs from the first operating range based on the second input signal, the controller also configured to change the threshold settings of the universal input module to be used with the second input devices by scaling the threshold settings based on the second operating range.

15. A first locomotive in accordance with claim 14 further comprising a universal output module configure to:
- determine an operating range of a controlled device;
- receive a controller output corresponding to the controlled device; and
- generate a module output using the controller output scaled to the determined operating range.

16. A first locomotive in accordance with claim 14 wherein the different first input devices comprise a nominal voltage input device, an analog voltage signal input device, a frequency modulated input device, and a pulse input device.

17. A first locomotive in accordance with claim 14 further comprising a global positioning satellite (GPS) system input to said controller, said controller configured to determine a territory of operation of at least one of the first locomotive or the second locomotive using the GPS input, said controller further configured to select an operating range for at least one universal output module using the determined territory.

18. A first locomotive in accordance with claim 14 further comprising at least one of a data entry device configured to receive a manual input selecting a configuration stored in a memory of the controller and a data communication device configured to receive a configuration from off board the first locomotive, wherein the configuration includes associated operating ranges for at least one universal output module.

* * * * *

UNITED STATES PATENT AND TRADEMARK OFFICE
CERTIFICATE OF CORRECTION

PATENT NO. : 8,504,218 B2
APPLICATION NO. : 11/831387
DATED : August 6, 2013
INVENTOR(S) : Mollet et al.

It is certified that error appears in the above-identified patent and that said Letters Patent is hereby corrected as shown below:

In the Specification

In Column 3, Line 18, delete "voltage for" and insert -- voltage of, for --, therefor.

Signed and Sealed this
Twentieth Day of May, 2014

Michelle K. Lee
*Deputy Director of the United States Patent and Trademark Office*